United States Patent
Yamamoto et al.

(10) Patent No.: US 7,432,606 B2
(45) Date of Patent: Oct. 7, 2008

(54) ENGINE GENERATOR

(75) Inventors: Masanobu Yamamoto, Shizuoka-ken (JP); Takahide Sugiyama, Shizuoka-ken (JP)

(73) Assignee: Yamaha Motor Power Products Kabushiki Kaisha, Shizuoka (JP)

( * ) Notice: Subject to any disclaimer, the term of this patent is extended or adjusted under 35 U.S.C. 154(b) by 298 days.

(21) Appl. No.: 11/304,253

(22) Filed: Dec. 15, 2005

(65) Prior Publication Data

US 2006/0145550 A1 Jul. 6, 2006

(30) Foreign Application Priority Data

Dec. 15, 2004 (JP) ............... 2004-362257

(51) Int. Cl.
F02B 77/00 (2006.01)
H02K 5/00 (2006.01)

(52) U.S. Cl. .................. 290/1 R; 310/89; 322/1; 290/1 A

(58) Field of Classification Search .......... 310/89; D13/112, 114, 116; 290/1 R
See application file for complete search history.

(56) References Cited

U.S. PATENT DOCUMENTS

| | | | |
|---|---|---|---|
| 4,548,164 A | 10/1985 | Ylonen et al. | |
| 4,595,841 A | 6/1986 | Yaguchi | |
| 4,608,946 A | 9/1986 | Tanaka et al. | |
| 4,702,201 A | 10/1987 | Odo et al. | |
| 4,721,070 A | 1/1988 | Tanaka et al. | |
| 4,907,546 A | 3/1990 | Ishii et al. | |
| 4,958,599 A | 9/1990 | Yokoyama et al. | |
| 6,091,160 A | 7/2000 | Kouchi et al. | |
| 6,331,740 B1 | 12/2001 | Morohoshi et al. | |
| 6,525,430 B1 * | 2/2003 | Asai et al. ........ | 290/1 A |
| D478,043 S | 8/2003 | Iwatate et al. | |
| 6,661,107 B2 | 12/2003 | Higuchi et al. | |
| 6,758,169 B2 | 7/2004 | Suzuki et al. | |
| 6,792,897 B2 | 9/2004 | Higuchi et al. | |
| 6,917,121 B2 | 7/2005 | Akimoto et al. | |
| 7,023,101 B2 | 4/2006 | Wang | |
| 7,089,889 B2 | 8/2006 | Johnson et al. | |
| 7,252,063 B2 * | 8/2007 | Mazuka et al. ........ | 123/179.18 |
| 7,309,927 B2 * | 12/2007 | Sugiyama et al. ........ | 290/1 A |
| 2003/0178853 A1 | 9/2003 | Du Plessis et al. | |
| 2004/0021320 A1 | 2/2004 | Yamada et al. | |
| 2004/0155466 A1 | 8/2004 | Sodemann et al. | |

(Continued)

FOREIGN PATENT DOCUMENTS

JP 07-312846 11/1995

(Continued)

Primary Examiner—Burton Mullins
(74) Attorney, Agent, or Firm—Knobbe, Martens, Olson & Bear, LLP

(57) ABSTRACT

Mounts can be provided at the four corners of a bottom portion of an engine generator. Projections for mounting handles can be provided at a top portion of the engine generator in vertical alignment above the mounts. The bottom face of each mount can be formed with a fitting groove having an open end. Fitting the projections in the fitting grooves allows stacking plural engine generators. The mount can be constituted with a bottom portion, a side portion, and a reinforcing metal fitting. The projections can be disposed on a front frame and a rear frame, respectively, each formed in one body. The mounts can also be attached to the front frame and the rear frame.

11 Claims, 14 Drawing Sheets

U.S. PATENT DOCUMENTS

| | | |
|---|---|---|
| 2006/0157988 A1* | 7/2006 | Mazuka et al. ............... 290/1 A |
| 2006/0214425 A1* | 9/2006 | Yamamoto et al. .......... 290/1 A |
| 2006/0290138 A1 | 12/2006 | Kuo et al. |

FOREIGN PATENT DOCUMENTS

| | | |
|---|---|---|
| JP | 08-223856 | 8/1996 |
| JP | 10-213035 | 8/1998 |
| JP | 2002-309959 | 10/2002 |

\* cited by examiner US 7,432,606 B2

ENGINE GENERATOR

PRIORITY INFORMATION

This application is based on and claims priority under 35 U.S.C. §119 to Japanese Patent Application. No. 2004-362257, filed on Dec. 15, 2004, the entire contents of which is hereby expressly incorporated by reference.

BACKGROUND OF THE INVENTIONS

1. Field of the Inventions

The present inventions relate to engine generators having handles for carrying the associated engine generator and having mounts for supporting the engine generator.

2. Description of the Related Art

Engine generators having an engine for driving a generator to generate electric power have long been known. Some known engine generator designs include handles for carrying the engine generator, and mounts for supporting the engine generator. For example, Japanese Patent Document No JP-A-Hei 8-223856 illustrates such a generator. This generator has the top face provided with a handle which is bent in a squared U shape. The bottom face is formed with four support projections spaced apart from each other.

Each support projection has a rubber mount attached thereto. The support projection includes a shaft portion and a flange formed at the lower end of the shaft portion. The rubber mount also has a short tubular shape.

The upper portion of the rubber mount is formed with a hole for allowing insertion of the shaft portion. The lower portion also includes a hole for allowing insertion of the flange. With the rubber mount attached to the support projection, a space is formed below the flange, within the rubber mount.

SUMMARY OF THE INVENTION

An aspect of at least one of the embodiments disclosed herein includes the realization that, in some applications, users attempt to stack a number of engine generators vertically for storage in order to make the most of the space at a particular facility. For example, distributors of such engine generators may stack such generators to use the existing space most efficiently.

The engine generator described in JP-A-Hei 8-223856, however, is not easily stackable. Thus, to vertically stack the engine generators, users often use a sheets of plywood placed between the engine generators to create a vertical stack. Alternatively, some manufacturers offer a stacking kit with separate members configured to vertically stack engine generators. This results in a problem that stacking work of the engine generators becomes troublesome, and specific stacking members are required for each generator design, thereby increasing costs.

In accordance with at least one of the embodiments disclosed herein, an engine generator can comprise a handle disposed at a top portion of the engine generator configured to allow a user to carry the engine generator by the handle. A mount can be positioned at a bottom portion of the engine generator for supporting the engine generator. Additionally, a handle assembly can comprise a handle mounting portion and the handle, the handle mounting portion being configured to mount the handle to the engine generator. The handle can be disposed at the top portion of the engine generator in a generally vertical alignment above the mount. The mount can be shaped and oriented to engage the handle assembly if the handle assembly were disposed on another engine generator disposed below the mount, so as to allow stacking plural engine generators.

In accordance with another embodiment, an engine generator can comprise a handle assembly disposed at a top portion of the engine generator configured to allow a user to carry the engine generator by the handle assembly. A mount arrangement can be positioned at a bottom portion of the engine generator for supporting the engine generator in a freestanding upright position. The handle assembly and the mount arrangement can have shapes that are nestable with each other.

In accordance with yet another embodiment, an engine generator can comprise a handle assembly disposed at a top portion of the engine generator configured to allow a user to carry the engine generator by the handle assembly. A mount arrangement can be positioned at a bottom portion of the engine generator for supporting the engine generator in a freestanding upright position. Additionally, the engine generator can include means for allowing the handle assembly and the mount arrangement to be nestable with each other.

DETAILED DESCRIPTION OF THE PREFERRED EMBODIMENT

Figure 1:
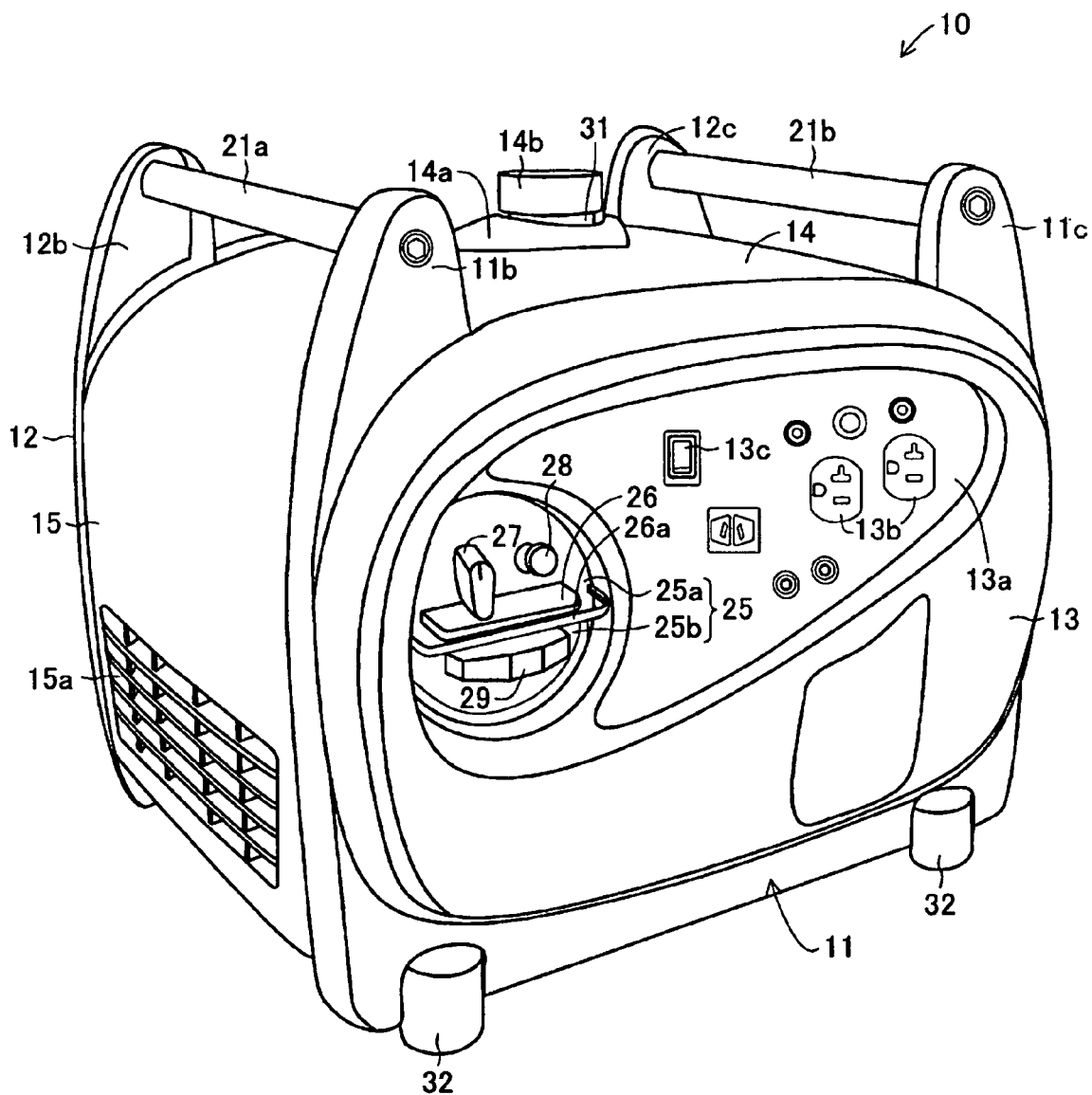
FIG. 1 is a front, top, and right side perspective view of an engine generator in accordance with an embodiment.
Figure 2:
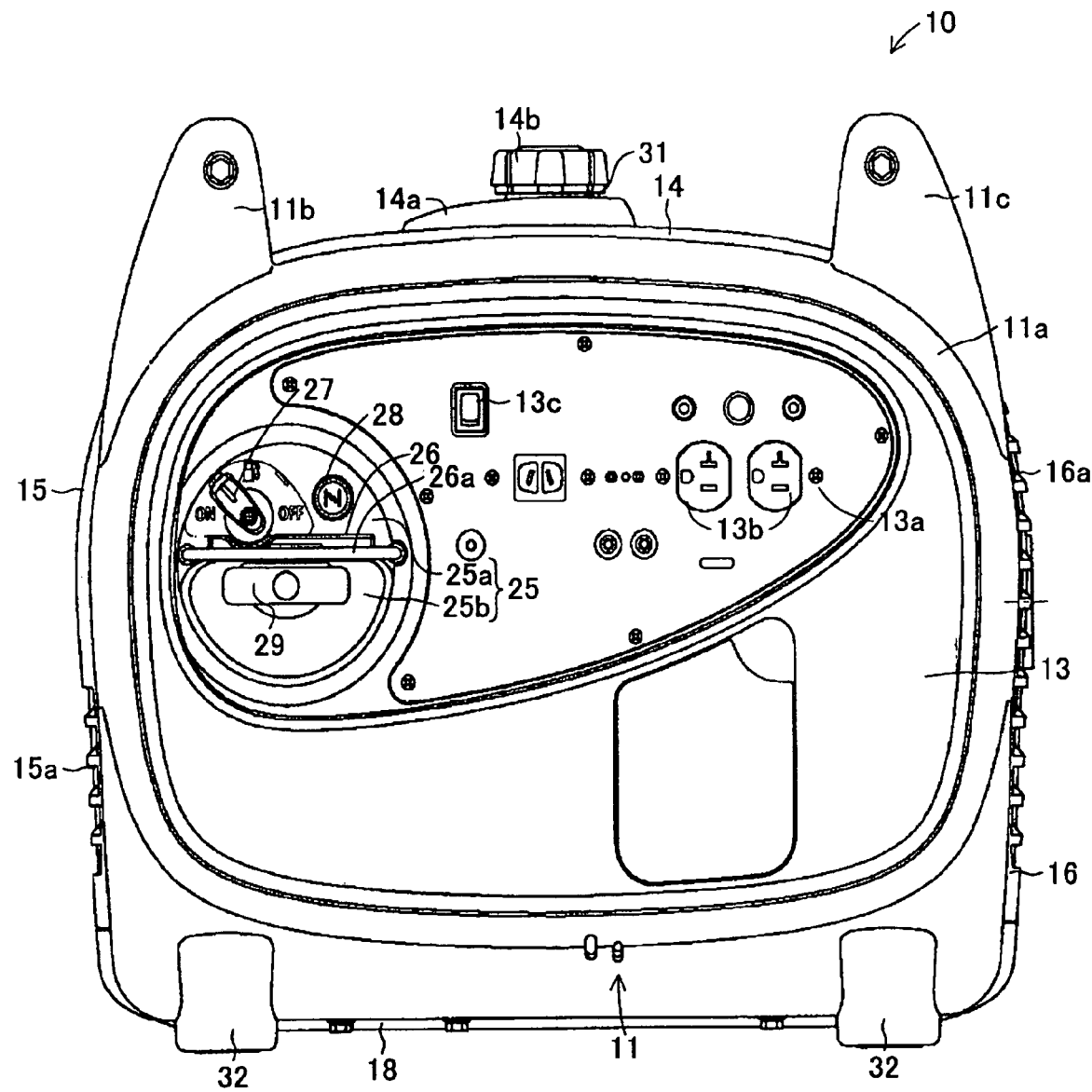
FIG. 2 is a front elevational view of the engine generator.
Figure 3:
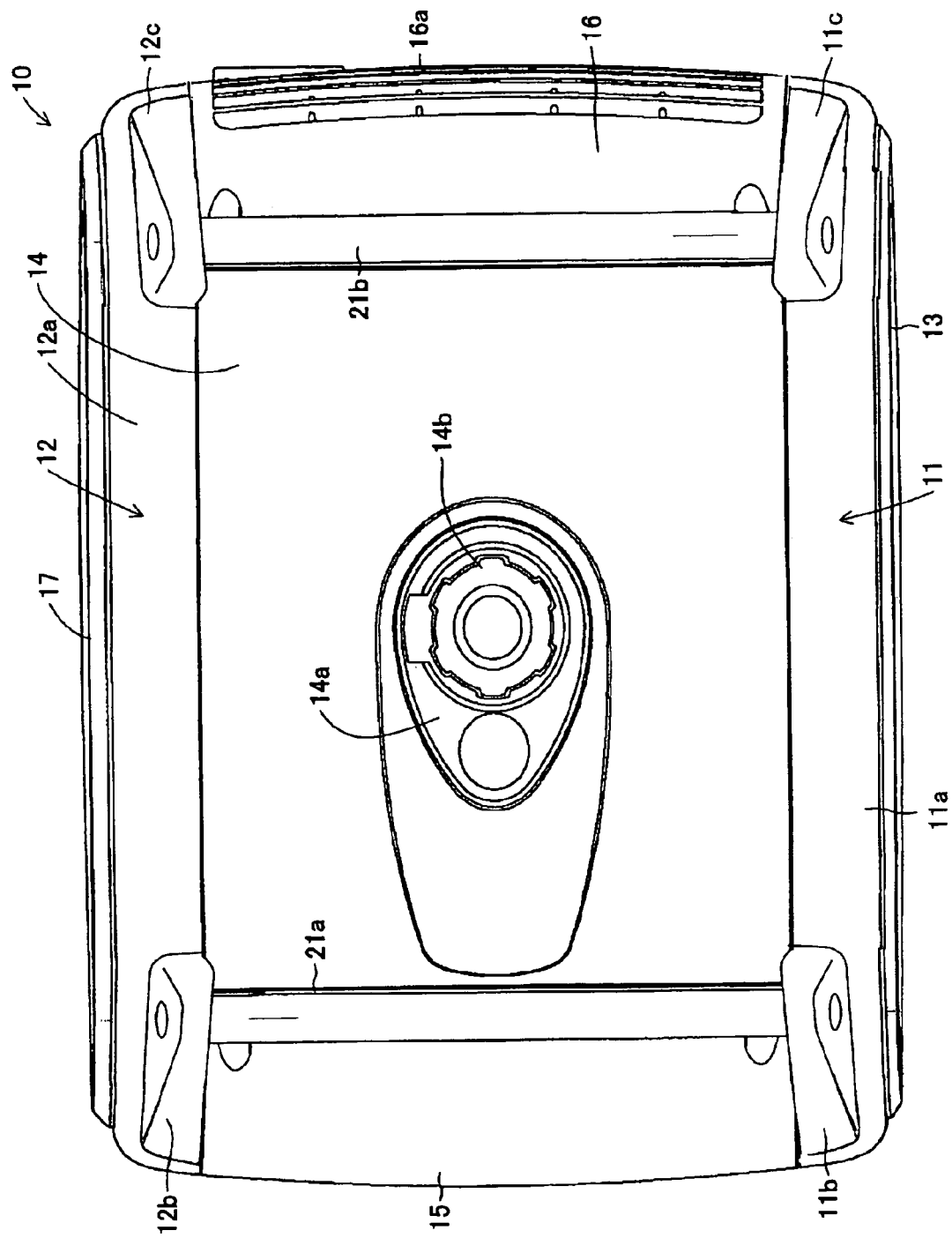
FIG. 3 is a top plan view of the engine generator.
Figure 4:
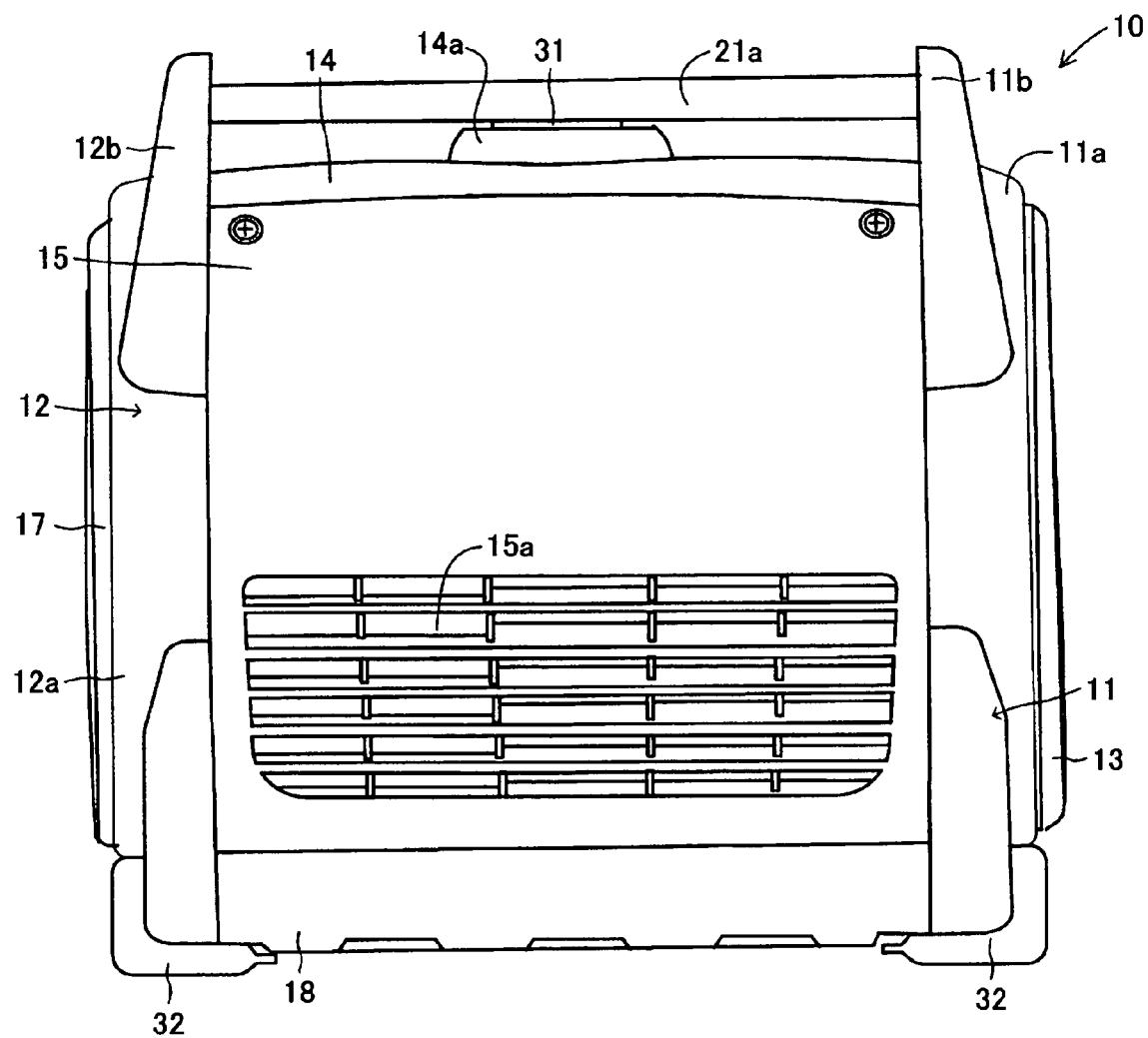
FIG. 4 is a left side elevational view of the engine generator.
Figure 5:
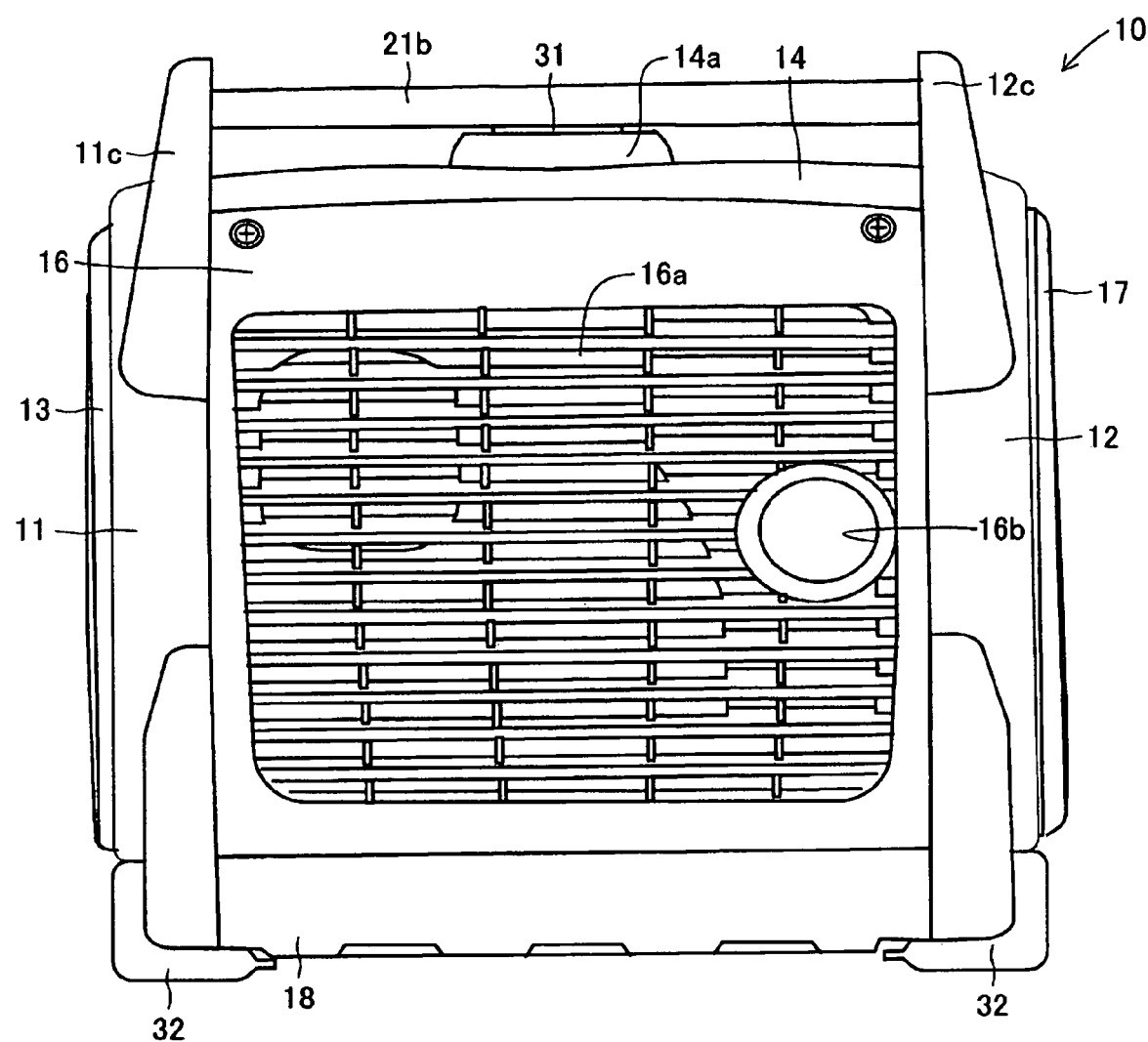
FIG. 5 is a right side elevational view of the engine generator.

An engine generator having handle and mount arrangements in accordance with various embodiments of the present invention is described below with reference to drawings. The handle and mount arrangements are described in the context of an engine generator because they have particular utility in this context. However, the handle and mount arrangement disclosed herein can be used in other contexts, such as, for example, any device that can be both carried and stacked.

With reference to FIGS. 1 through 5, the outer surface of the engine generator 10 can be formed in a rounded, generally box shape. The generator can also include a pair of front and rear frames 11, 12 spaced apart from each other in the forward and rearward directions. A front panel 13 and a rear panel 17 can be located within the front frame 11 and the rear frame 12, respectively. A top panel 14, an intake cover 15, an exhaust cover 16 and a bottom panel 18 can be located between the front frame 11 and the rear frame 12. However, other configurations can also be used.

The front frame 11 and the rear frame 12 can be aluminum die castings in the same shape, however, other configurations can also be used. As used herein, the front frame 11 and the rear frame can be considered as comprising support members.

The front frame 11 and the rear frame 12 can also include frame bodies 11a, 12a, respectively, formed in a generally square shape with both top sides having a round shape. The top left and right sides of the frame body 11a are formed with a pair of projections 11b, 11c extending upward, and can thus be considered as serving as handle mounting portions. Both of the top sides of the frame body 12a can be formed with a pair of projections 12b, 12c extending upwardly, and can also be considered as serving as handle mounting portions.

The side faces of the projections 11b, 11c, 12b, and 12c, which can be disposed laterally outside the engine generator 10, each can extend upwardly and can have a curved shape from an upper side portion of the engine generator 10 to the inside thereof. The side faces of the projections 11b, 11c, 12b, and 12c, which can be disposed laterally inside the engine generator 10, each can extend generally linearly from the top face of the engine generator 10 to the slightly outside thereof and upwardly.

The front faces of the projections 11b, 11c and the rear faces of the projections 12b, 12c, outside the engine generator 10 in the forward and rearward directions each can extend upwardly and inwardly from a top portion of the front or rear face of the engine generator 10. The inside faces of the projections 11b, 11c, 11b, and 11c, in the forward and rearward directions each have a recess corresponding to the shape of the outside face. Their peripheral edges can extend generally linearly upwardly from the top face of the engine generator 10. Thus, upper portions of the projections 11b, 11c, 11b, and 12c are tapered toward the inside of the engine generator 10. However, other configurations can also be used.

Figure 6:
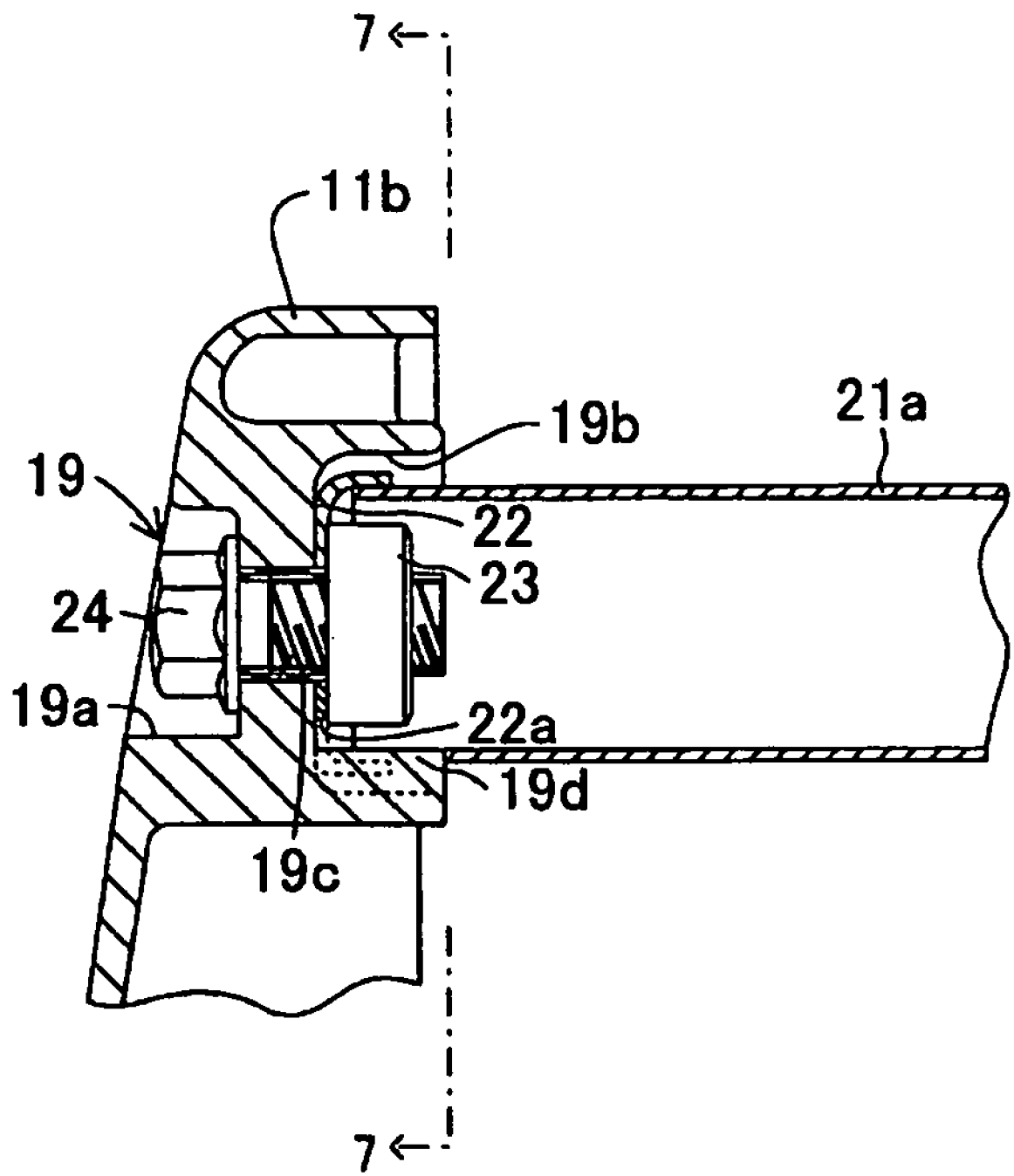
FIG. 6 is an enlarged sectional view of a handle portion of the engine generator, showing a state in which a handle is mounted to a projection.

With reference to FIG. 6, the upper portions of the projections 11b, 11c, 11b, and 12c (only projection 11b being shown in FIG. 6) can each be formed with an insertion hole 19 extending therethrough in the forward and rearward directions. The insertion hole 19 can include a middle-diameter portion 19a positioned in the outside face of the projection, a large-diameter portion 19b positioned in the inside face of the projection, and a small-diameter portion 19c formed between the middle-diameter portion 19a and the large-diameter portion 19b. A small projection 19d can also be provided at the lower edge of the large-diameter portion 19b. Bar-like handles 21a, 21b can extend between the opposing projections 11b, 12b and 11b, 12c, respectively, and are attached thereto through the insertion holes 19. However, other configurations can also be used.

The handles 21a, 21b can include iron pipes, or can be made from other materials or be provided with other shapes. The opposing open ends of the handles 21a, 21b can each be provided with a cap-like plate 22. In some embodiments, the plate 22 can have a hole formed in the central portion thereof. A nut 23 can be fixed to the inside face of the plate 22 (inside the handles 21a, 21b; FIG. 6 shows the front end of the handle 21a).

Figure 7:
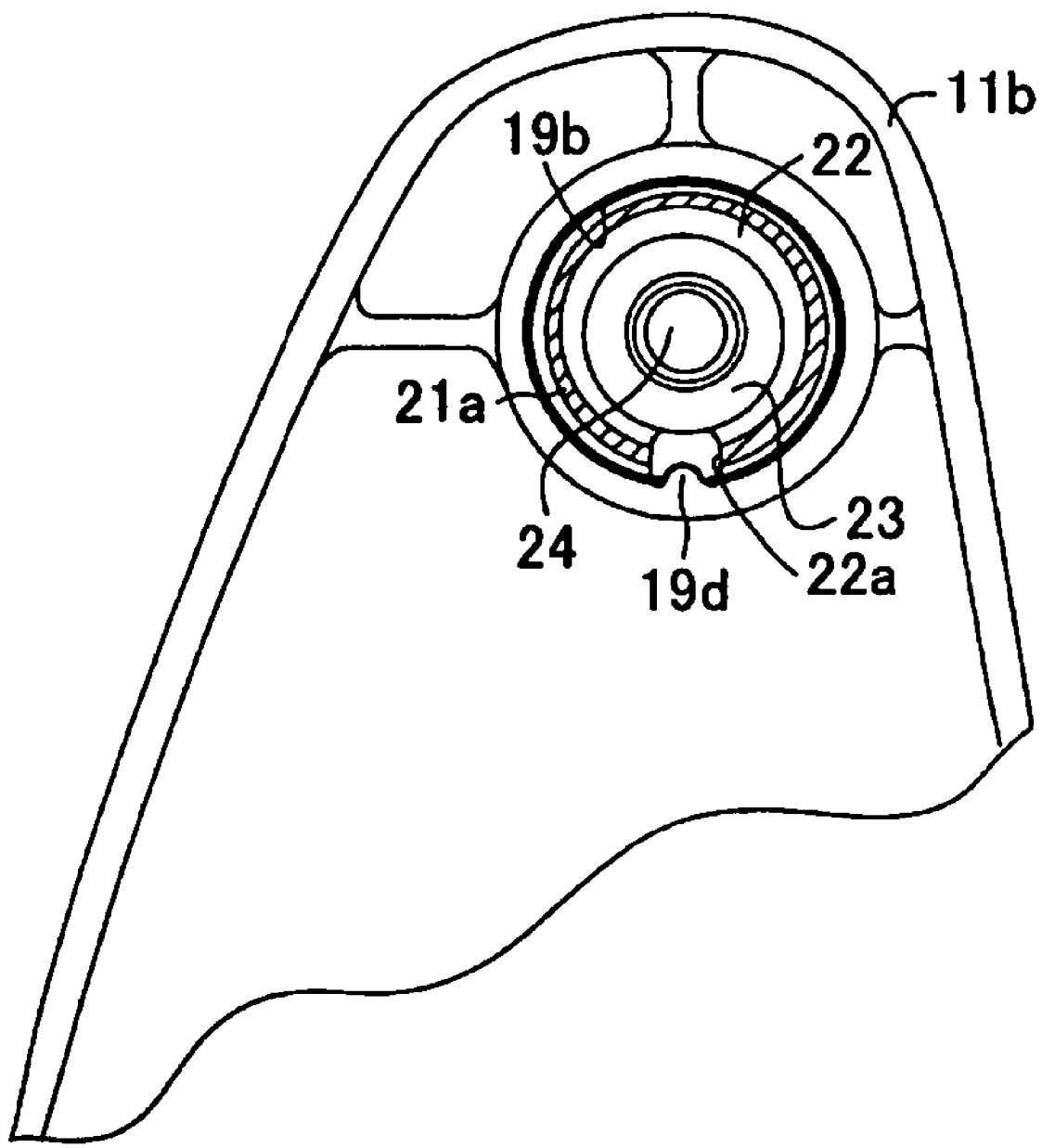
FIG. 7 is a sectional view taken along the line 7-7 of FIG. 6.
Figure 8:
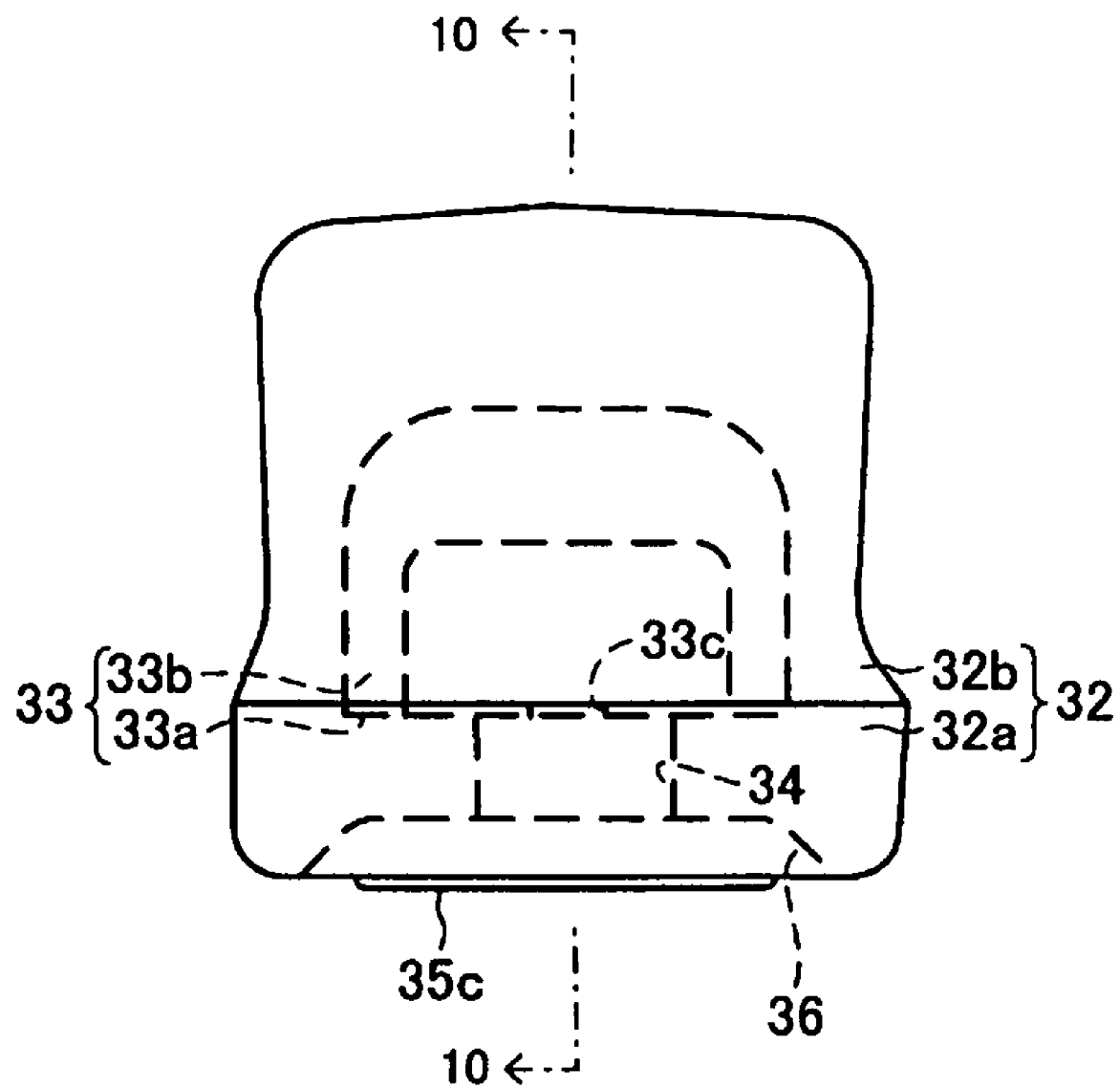
FIG. 8 is an enlarged front elevational view of a mount of the engine generator.
Figure 9:
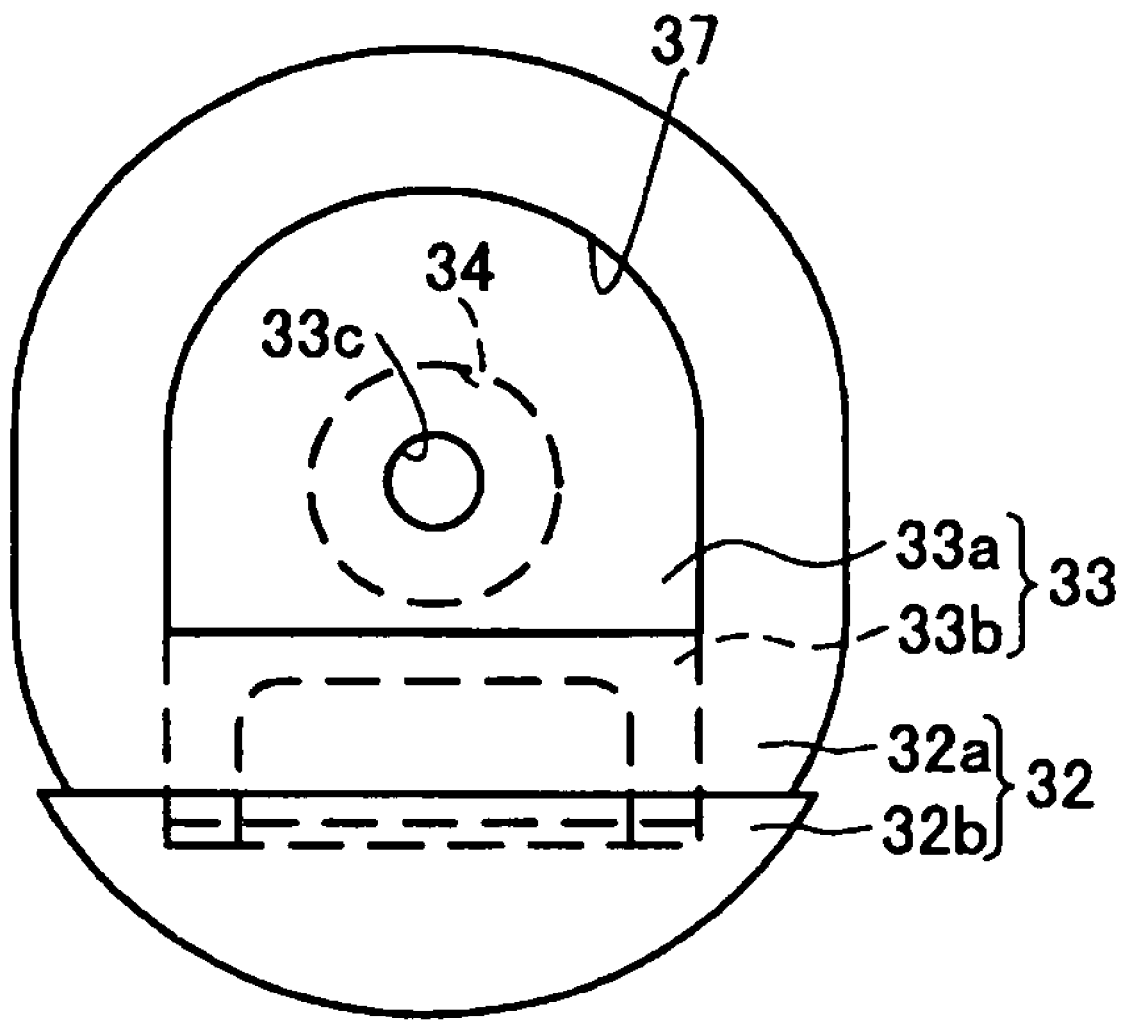
FIG. 9 is a top plan view of the mount of FIG. 8.
Figure 10:
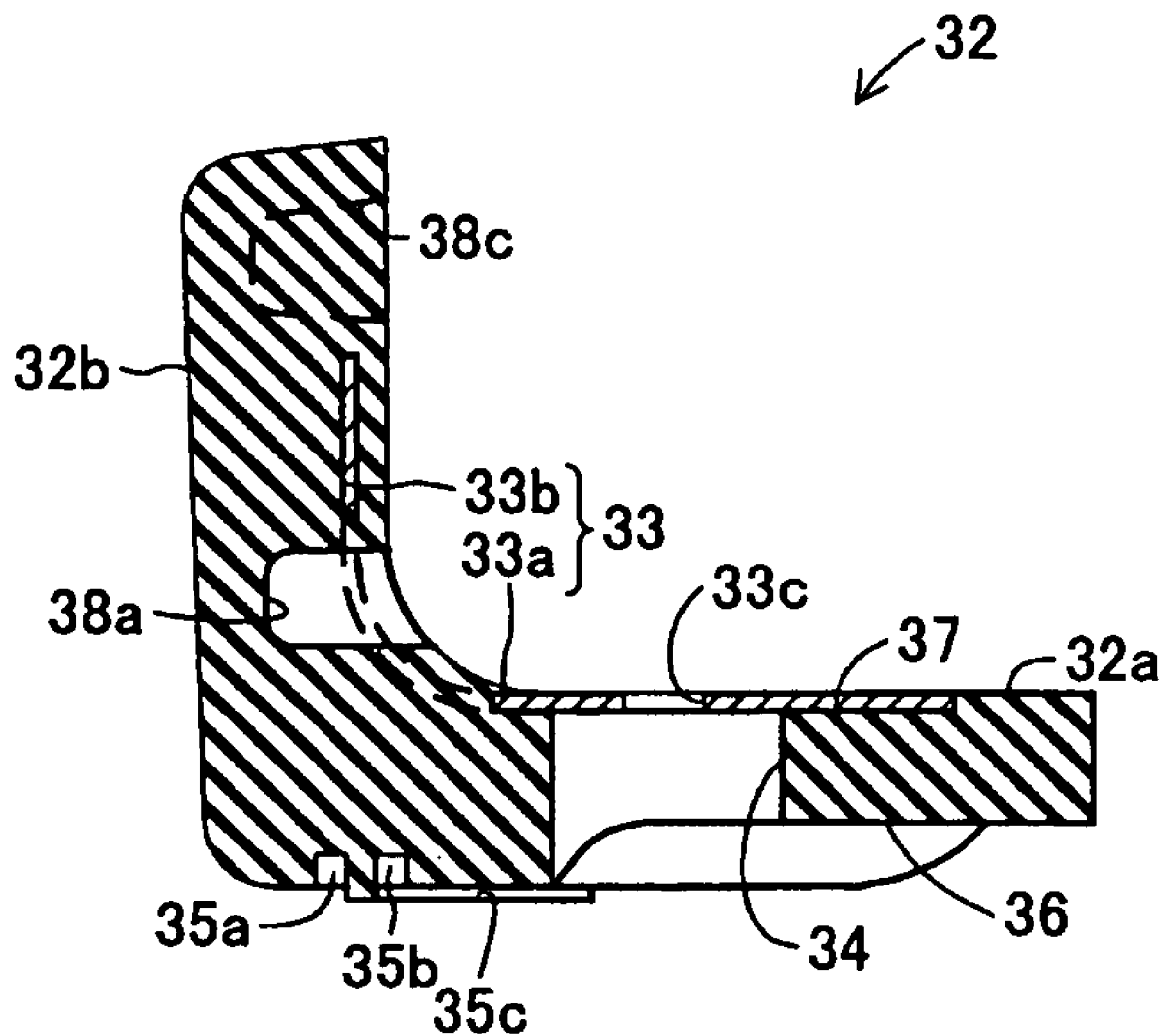
FIG. 10 is a sectional view taken along the line 10-10 of FIG. 8.
Figure 11:
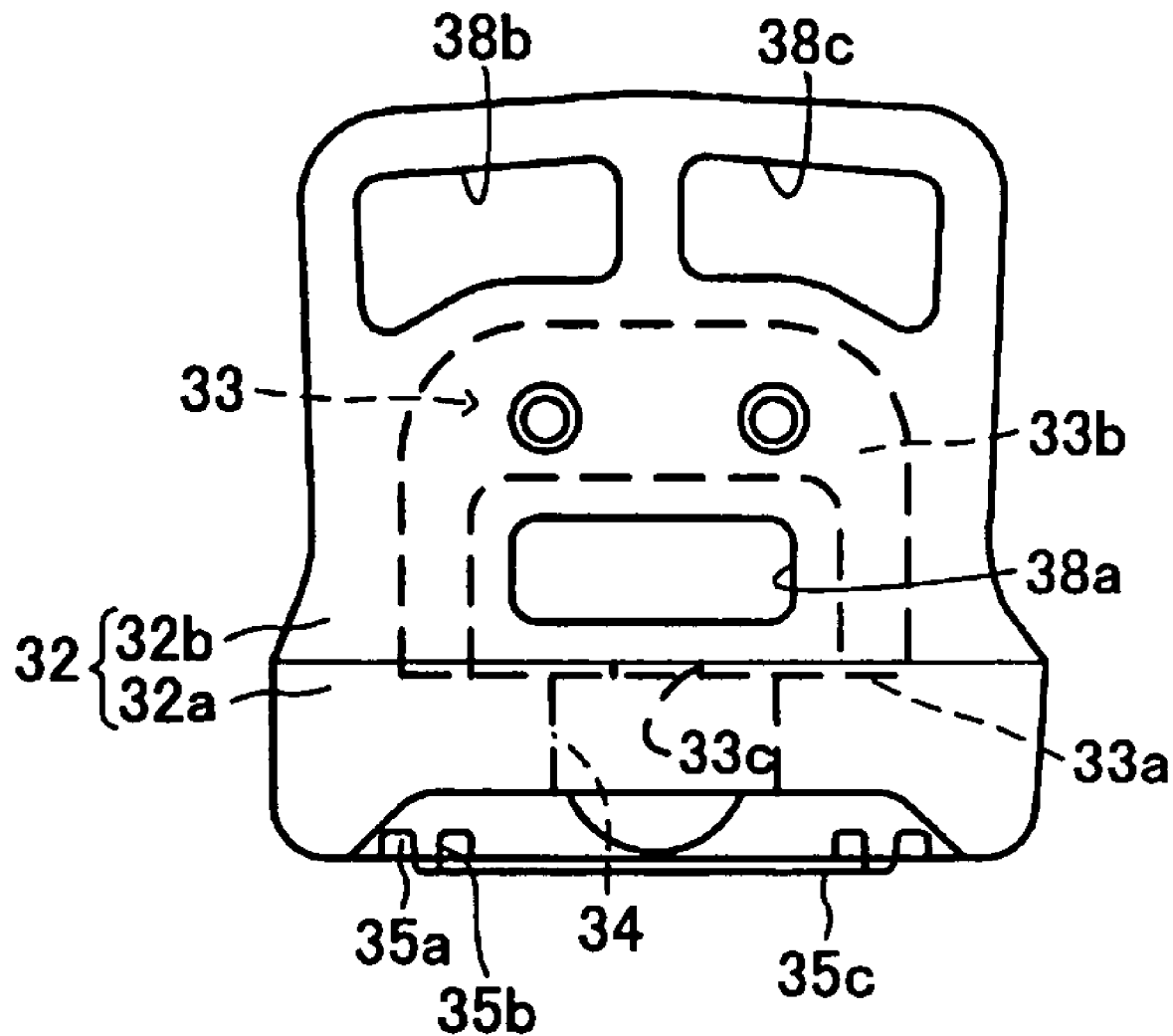
FIG. 11 is a rear elevational view of the mount.
Figure 12:
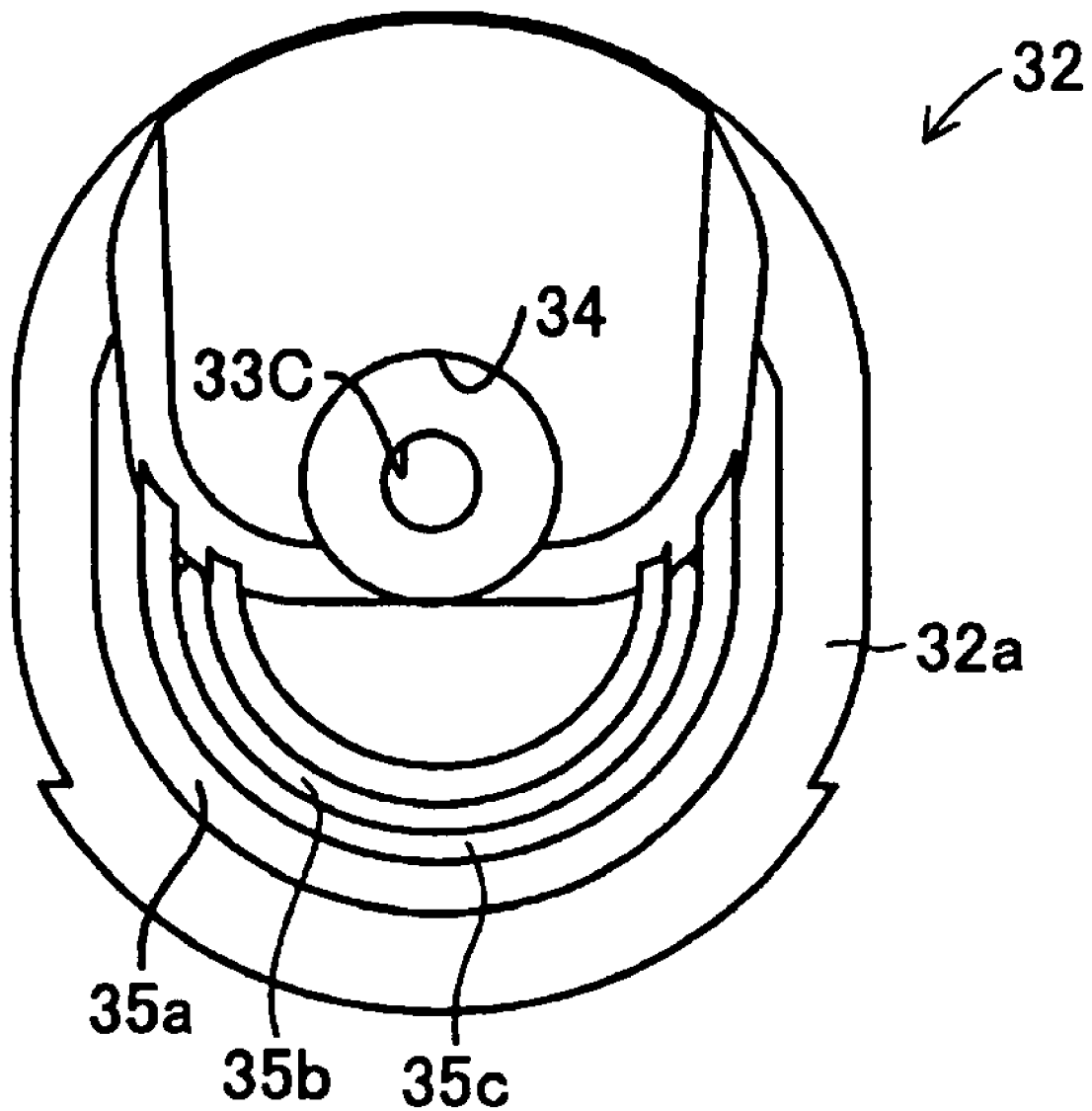
FIG. 12 is a bottom plan view of the mount.

A notch 22a shown in FIG. 7 can be provided at the ends of the handles 21a, 21b and at the lower edges of the plates 22. A bolt 24 can be inserted in each insertion hole 19 and the nut 23 can be screwed on the bolt 24, so that the ends of the handles 21a, 21b are secured to the corresponding projections 11b, 11c, 12b, and 12c.

If the small projection 19d of the insertion hole 19 can be located in each notch 22a of the handles 21a, 21b, the handles 21a, 21b are prevented from rotation relative to the projections 11b, 11c, 12b, and 12c. This allows the bolt 24 to be smoothly screwed in the nut 23.

The engine generator 10 can be carried by gripping the pair of handles 21a, 21b. In this case as well, since the handles 21a, 21b are prevented from rotation due to the engagement of the notch 22a and the small projection 19d, the engine generator 10 can be carried more easily.

The front panel 13 can be attached within the front frame 11 and defines a front portion of the engine generator 10. The front panel 13 can be formed of resin material, as an integral component, however, other configurations including multi-component configurations, can also be used.

The front panel 13 can be formed in a generally square shape with rounded corners. An upper portion of the front panel 13 can be formed with a recess 13a of a generally oval shape having a large vertical width on its left-side portion (on the left-hand side as viewed from the front side shown in FIGS. 1 and 2) and a small vertical width on its right-side portion.

A circular recess 25 can be formed in the left portion of the recess 13a. Outlets 13b, various switches 13c, and the like can be provided in portions other than the recess 25 of the recess 13a.

The recess 25 can be separated into an upper portion and a lower portion by a partition 26. The partition can be arranged generally horizontally and can include a plate-like wall member projecting toward the front side. A protective portion 26a can be provided in a manner to enclose the front face and the opposite faces of the partition 26. In some embodiments, the protective portion can be an iron bar, however, other materials and shapes can also be used. An upper area 25a comprising the upper portion of the recess 25 can have a smaller (shallower) depth than a lower area 25b which can comprise the lower portion of the recess 25.

The upper area 25a, which can have a shallower depth, can have a cock operating portion 27 and a choke operating portion 28 laterally aligned with each other. The lower area 25b of a larger depth can have a recoil knob 29.

The cock operating portion 27, choke operating portion 28 and recoil knob 29 can be disposed in a manner so as to not project outwardly from the surface of the peripheral edge of the front panel 13. The partition 26 can be formed with the front panel 13 in one body, and the protective portion 26a can be fixed to the front panel 13 with the ends of the protective portion 26a inserted in the front panel 13.

The top panel 14 can be attached between the opposing top edges of the front frame 11 and the rear frame 12. The top panel can define a top portion of the engine generator 10.

The top panel 14 can be formed in the shape of a curved surface and extends laterally with its central portion curved upwardly. The generally central portion of the top panel 14 can have a fuel supply portion inserting portion 14a. The inserting portion can be raised for allowing insertion of a fuel supply port 31 of a fuel tank (not shown). A tank cap 14b can be attached to the fuel supply port 31 through the fuel supply portion inserting portion 14a.

The intake cover 15 and the exhaust cover 16 can be attached between the opposing side edges of the front frame 11 and the rear frame 12 and thus can comprise side portions of the engine generator 10. A lower portion of the intake cover 15 can be formed with a plurality of lateral intake slits 15a aligned generally vertically with each other. The exhaust cover 16 at the surface of its large central portion can be also formed with a plurality of lateral exhaust slits 16a aligned generally vertically with each other. A circular exhaust hole 16b can be formed in a vertically generally central portion on the rear side of the exhaust cover 16. However, other configurations can also be used.

The rear panel 17 can be attached within the rear frame 12 and thus can comprise a rear portion of the engine generator 10. The overall shape of the rear panel 17 can be generally the same as that of the front panel 13. However, the rear panel 17 can be formed with no recesses or the like, and/or can have other configurations.

The bottom panel 18 can also be attached between the opposing bottom edges of the front frame 11 and the rear frame 12 and thus can comprise a bottom portion of the engine generator 10. The left and right edges of the bottom panel 18 can be slightly raised from the opposite sides of the bottom face and extend generally upwardly, and as such, the left and right edges of the bottom panel 18 can comprise lower portions of the corresponding side portions of the engine generator 10.

The top panel 14, intake cover 15, exhaust cover 16, rear panel 17 and bottom panel 18 can each be integrally formed of resin material. However, other configurations, including multi-component configurations can also be used.

With reference to FIGS. 8-12, rubber mounts 32 can be attached at the sides of the bottom edges of the front frame 11 and the rear frame 12, below the top ends of the projections 11b, 11c, 11b, and 12c. The mounts 32 can be formed in the shape shown in FIGS. 8 though 12, however, other configurations can also be used. The rubber mounts 32 can include a bottom portion 32a, a side portion 32b, and a reinforcing metal fitting 33. However, other configurations can also be used.

The bottom portion 32a can be located in contact with the bottom face of the front frame 11 or rear frame 12, and the bottom panel 18. The side portion 32b can extend upwardly from one end of the top face of the bottom portion 32a and can be located in contact with the front face of the front frame 11 or the outside face of the rear frame 12.

The reinforcing metal fitting 33 can extend from the top face of the bottom portion 32a into the side portion 32b, to reinforce the mount 32. In the description hereinafter, the end of the bottom portion 32a, on the side portion 32b side is referred to as "base end," and the end of the bottom portion 32a, opposite the base end, "the other end."

The bottom portion 32a can have a generally oval shape when viewed from the bottom face side, and can have a screw mounting hole 34 extending generally vertically through the generally central portion. The central area of a portion of the bottom face of the bottom portion 32a, on the base end side, can have semi-circular grooves 35a, 35b spaced apart from each other. A semi-circular projection 35c projecting downwardly can be formed between the semi-circular grooves 35a, 35b. However, other configurations can also be used.

A fitting groove 36 can also be provided in the central area of a portion of the bottom face of the bottom portion 32a, on the other end side. The fitting groove 36 can have at least one of a width, length, depth, and a shape configured to receive of the top end of at least one or two projections formed on another generator disposed beneath the generator 10. As such, the groove 36 can engage or nest with a corresponding projection, e.g., one of projections 11b, 11c, 12b, and 11c, formed on a generator disposed below the generator 10. For example, the generator 10 can have an arrangement of mounts 32 having a layout corresponding to the layout of projections 11b, 11c, 12b, and 12c. Thus, two generators constructed in accordance with the description of the 10 can be stacked such at least one or two of the projections 11b, 11c, 12b, and 12c engage or nest with at least one or two of the mounts 32 of the other generator. However, a generator stacked with the generator 10 might have other kinds of projections in the same or similar spacing arrangement and still be received within at least one or two of the fitting grooves 36 or at least one or two of the projections 11b, 11c, 121b, and 12c disposed on the generator 10. Where two generally identical generators 10 are stacked, all of the projections 11b, 11c, 12b, and 12c can be engaged or nested with respective grooves 36.

The central portion of the top face of the bottom portion 32a can be formed with a recess 37 of a shallower depth. The recess 37 can have a semi-circular shape at its portion on the other end side, and a square shape at its portion on the base end side. However, other configurations can also be used.

The side portion 32b can have a slightly narrower part formed on the lower side with respect to its width. The side portion 32b can be formed in the shape of an arc as viewed in top or bottom plan view, and can be formed with a plate-like member having a generally square shape as viewed in front view. A lower central portion of the inside face of the side portion 32b can be formed with a generally square recess 38a, and portions of the inside face of the side portion 32b on the upper left and right sides can be formed with generally square recesses 38b, 38c, respectively, which form a symmetrical shape.

The reinforcing metal fitting 33 can include a horizontal portion 33a and a vertical portion 33b. The horizontal portion 33a can be received in the recess 37 and orientated so as to be exposed at the top face of the bottom portion 32a. The vertical portion 33b can extend upwardly from a base end of the horizontal portion 33a into a portion of the side portion 32b closer to its inside face, to form a curved shape.

A portion of the horizontal portion 33a which corresponds to the screw mounting hole 34 of the bottom portion 32a can be formed with a screw insertion hole 33c having a diameter smaller than the screw mounting hole 34 and being coaxial therewith. The vertical portion 33b can be formed in the shape of an arch to enclose both sides and the top end of the recess 38a and can be positioned below the recesses 38b, 38c.

Figure 13:
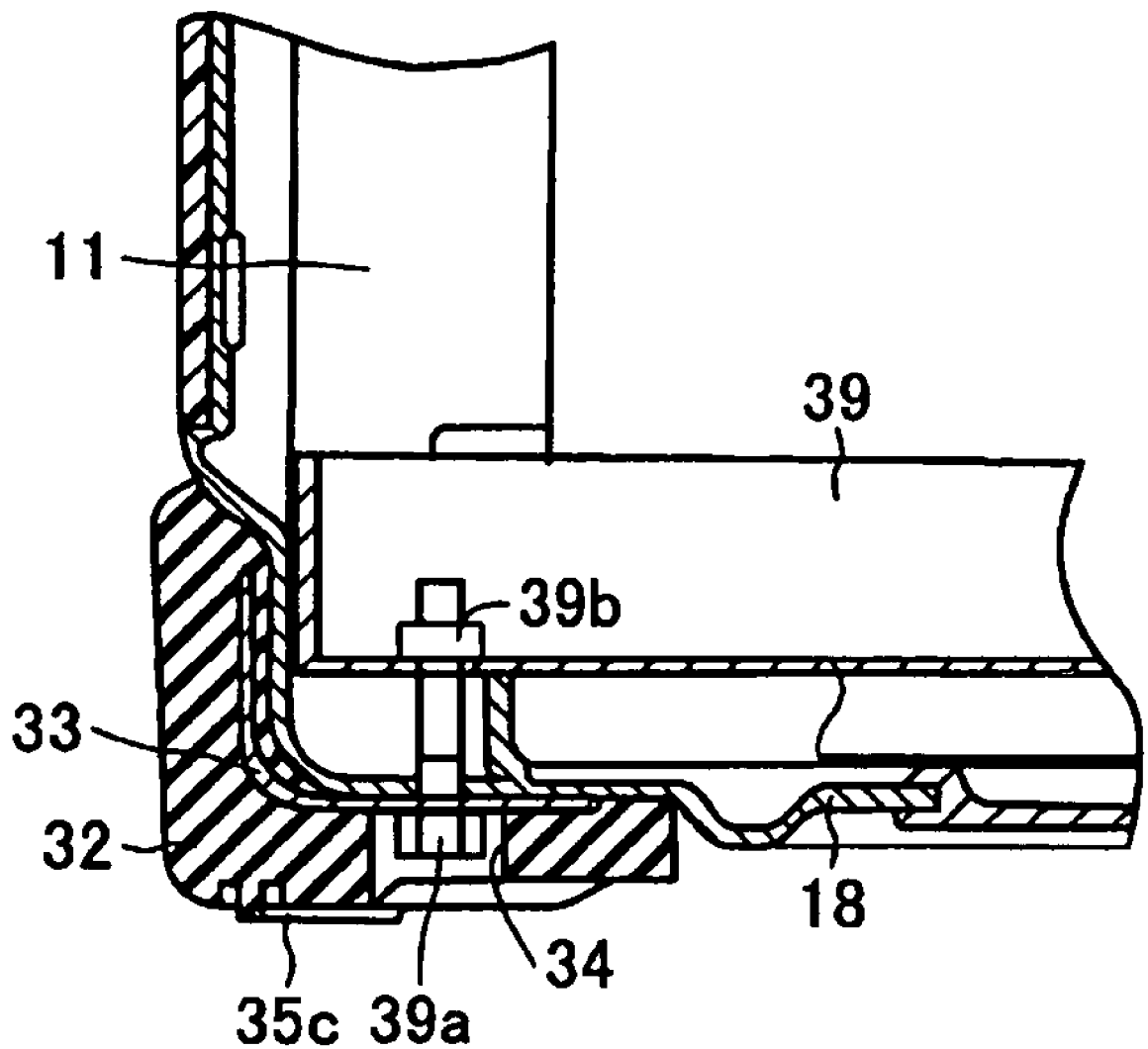
FIG. 13 is an enlarged sectional view of the mount, showing a state in which the mount is attached to a bottom panel of the engine generator.

There can be interposed a securing frame 39 made of a metal sheet shown in FIG. 13 between the front frame 11 and the rear frame 12 to securely connect these frames on the left and right sides. A frame portion is thus formed.

The mount 32 can be secured to the securing frame 39 with a bolt 39a. For example, the bottom panel 18 and the securing frame 39 can be formed with screw insertion holes. These screw insertion holes can be aligned with the screw insertion hole 33c of the horizontal portion 33a to receive the bolt 39a so that the mount 32 can be attached to a body of the engine generator 10. After the bolt 39a is inserted in the screw mounting hole 34, the screw insertion hole 33c, and the screw insertion holes of the bottom panel 18 and the securing frame 39, the bolt 39a can be fitted in a nut 39b welded fixedly to the upper face of the securing frame 39. The mount 32 is thereby secured to the securing frame 39.

In this configuration, to start the engine generator 10, the user first operates the cock operating portion 27 to open (turn on) a fuel cock and then pulls the choke operating portion 28 adjacent to the cock operating portion 27. In such state, the user pulls the recoil knob 29 to start an engine (not shown). After the engine is sufficiently warmed up, the user returns the choke operating portion 28 to its original position. Then, power generated by the engine generator 10 can be used in other equipment by plugging a cable in the outlet 13b.

Figure 14:
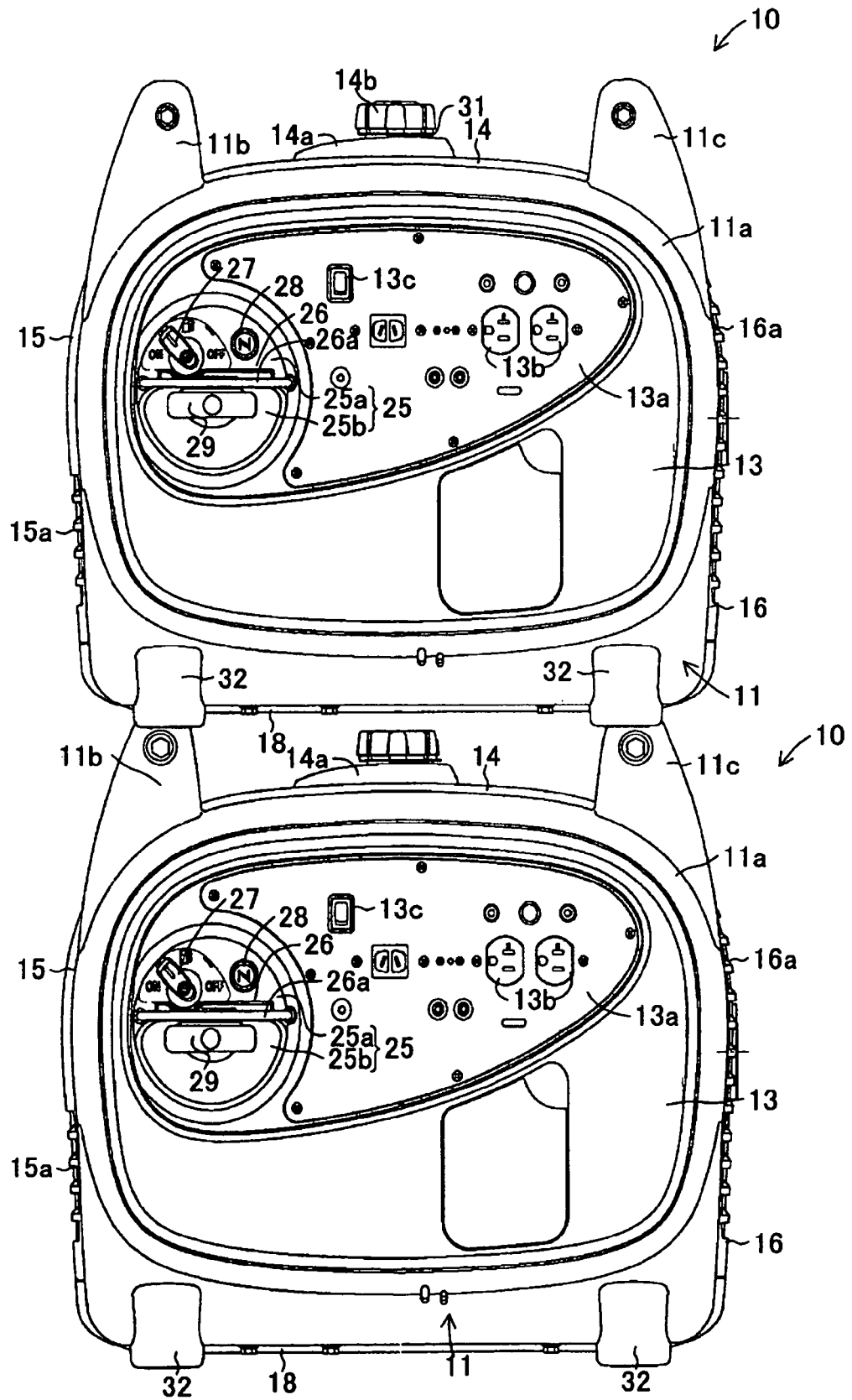
FIG. 14 is a front elevational view of two engine generators stacked generally vertically.

The engine generators 10 are stackable in the case that those produced at production facilities are stored at a certain location or in a distributor warehouse or the like. In this case, the worker places the engine generator 10 on a horizontal floor or the like as shown in FIG. 14. Then, another engine generator 10 can be placed on top of the engine generator 10 placed below, with the top ends of the projections 11b, 11c, 12b, and 12c of the upper engine generator 10 fitted in the fitting grooves 36 of the mounts 32 of the lower engine generator 10.

In a similar manner, still another engine generator 10 can be stacked on top of the upper engine generator 10. In this case, the worker grips the handles 21a, 21b to pick up the engine generator 10. The plural engine generators 10 thus stacked one above the other are prevented from being displaced from each other and remain stable through the periphery of each fitting groove 36 excluding its portion closer to the other end of the mount 32. Further, since the projections 11b, 11c, 12b, and 12c and the corresponding mounts 32 of the stacked engine generators 10 are vertically aligned, more stable stacking can be achieved.

As in the foregoing, in the engine generator 10 in accordance with the present embodiment, the mounts 32 for supporting the engine generator 10, and the projections 11b, 11c, 12b, and 12c for mounting the handles 21a, 21b for carrying the engine generator 10 are vertically aligned with each other. Thus, stacking two engine generators 10 can be achieved in a way such that one engine generator 10 can be placed on a floor or the like, and the mounts 32 of the other engine generator 10 are fitted on top of the projections 11b, 11c, 12b, and 12c of the lower engine generator 10. Also, on top of the upper engine generator 10, another engine generator 10 can be placed in succession. This allows effective use of storage space.

Further, since the fitting groove 36 can be formed in the bottom face of the mount 32, the projections 11b, 11c, 12b, and 12c and the mounts 32 are reliably fitted to each other. This allows stable stacking of the plural engine generators 10. Further, an end of the fitting groove 36 can be open. Thus, in the case of placing another engine generator 10 on top of the engine generator 10 placed below, the worker can displace the upper engine generator 10 relative to the lower engine generator 10 to bring it into position. This allows easy positioning of the engine generator 10 to be stacked, thereby facilitating stacking work.

Further, in the foregoing embodiment, the mount 32 has the bottom portion 32a which contacts the bottom face of the front frame 11 or rear frame 12 and the bottom panel 18, and the side portion 32b which contacts the front face of the front frame 11 or the outside face of the rear frame 12. Thus, the mount 32 can be fixed to the bottom panel 18 using only a single bolt 39a while rotation of the mount 32 is prevented. Further, the side portion 32b of the mount 32 can be visible from the front side of the engine generator 10, thereby providing an appearance of stability. Further, the body of the engine generator 10 and the mount 32 have good shapes in terms of design.

Further, in the foregoing engine generator 10, the front portion of the engine generator 10 has the front frame 11 formed in one body and having the projections 11b, 11c, and the rear portion of the engine generator 10 has the rear frame 12 formed in one body and having the projections 11b, 12c. The front frame 11 and the rear frame 12 have the mounts 32 at portions of the lower edges of the front frame 11 and the rear frame 12 which correspond to the projections 11b, 11c, 12b, and 12c. Thus, the frame members 11, 12 can enhance the columnar strength of the generator 10, thereby increasing the generator's ability to be stacked. According to this configuration, since strength of the engine generator 10 under vertical load can be increased, it can be possible to stack the plural engine generators 10 in a stable manner. Further, since the mount 32 has the reinforcing metal fitting 33, strength of the mount 32 can be increased, so that the engine generator 10 can be supported in a stable manner.

The engine generator 10 is not limited to the embodiments described above and can be practiced with appropriate modifications. For example, in the foregoing embodiment, the mounts 32 are formed with the fitting grooves 36 to receive the projections 11b, 11c, 12b, and 12c. Instead, the top faces of the projections 11b, 11c, 12b, and 12c may be formed with fitting recesses to receive the mounts 32. In this alternative as well, the same function and effect are obtained as when the fitting grooves 36 are formed in the bottom faces of the mounts 32.

Further, in the foregoing engine generator 10, the fitting groove 36 can be formed closer to the other end of the mount 32 to have its open end on the other end side. However, the fitting groove may be located closer to the base end of the mount and have the open end on the base end side. Further, the fitting groove may extend to the side portion of the mount. Further, the rest of the configuration, materials and the like of the engine generator can be modified as appropriate within the technical scope of the present inventions.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine generator comprising a handle disposed at a top portion of the engine generator configured to allow a user to carry the engine generator by the handle, a mount positioned at a bottom portion of the engine generator for supporting the engine generator, and a handle assembly comprising a handle mounting portion and the handle, the handle mounting portion being configured to mount the handle to the engine generator, the handle being disposed at the top portion of the engine generator in a generally vertical alignment above the mount, wherein the mount is shaped and oriented to engage the handle assembly if the handle assembly were disposed on another engine generator disposed below the mount, so as to allow stacking plural engine generators, wherein a bottom face of the mount is formed with a recess, in which the handle mounting portion can be fitted to allow stacking the plural engine generators.

2. The engine generator according to claim 1, wherein part of a peripheral wall portion defining the recess is cut to form an open portion.

3. The engine generator according to claim 2, wherein the mount is disposed along a corner formed by the bottom face and the side face of the engine generator.

4. The engine generator according to claim 1, wherein the top face of the handle mounting portion is formed with a recess, in which the mount is fitted to allow stacking the plural engine generators.

5. The engine generator according to claim 4, wherein the mount is disposed along a corner formed by the bottom face and the side face of the engine generator.

6. The engine generator according to claim 1, wherein the mount is disposed along a corner formed by the bottom face and the side face of the engine generator.

7. The engine generator according to claim 6 further comprising a support member formed in one body and extending from the bottom portion to the top portion of the engine generator, the support member being provided with the mount and the handle mounting portion.

8. The engine generator according to claim 7, wherein the mount is provided with a reinforcing member.

9. The engine generator according to claim 6, wherein the mount is provided with a reinforcing member.

10. The engine generator according to claim 1 further comprising a support member formed in one body and extending from the bottom portion to the top portion of the engine generator, the support member being provided with the mount and the handle mounting portion.

11. The engine generator according to claim 1, wherein the mount is provided with a reinforcing member.

\* \* \* \* \*

UNITED STATES PATENT AND TRADEMARK OFFICE
CERTIFICATE OF CORRECTION

| | | |
|---|---|---|
| PATENT NO. | : 7,432,606 B2 | Page 1 of 1 |
| APPLICATION NO. | : 11/304253 | |
| DATED | : October 7, 2008 | |
| INVENTOR(S) | : Masanobu Yamamoto et al. | |

It is certified that error appears in the above-identified patent and that said Letters Patent is hereby corrected as shown below:

At column 3, line 32, change "11b, and 11c," to --12b, and 12c,--.

At column 3, line 36, change "11b" to --12b--.

At column 3, line 40, change "11b" to --12b--.

At column 3, line 43, change "diameter:" to --diameter--.

At column 3, line 51, change "11b" to --11c--.

At column 5, line 27, change "11b" to --12b--.

At column 5, line 61, change "11c" to --12c--.

At column 6, line 6, change "121b" to --12b--.

At column 7, line 59, change "11b" to --12b--.

Signed and Sealed this

Sixth Day of April, 2010

David J. Kappos
*Director of the United States Patent and Trademark Office*